United States Patent [19]
Cvijanovic

[11] Patent Number: 5,772,288
[45] Date of Patent: Jun. 30, 1998

[54] VEHICLE WHEEL

[75] Inventor: Ratko Cvijanovic, Henderson, Ky.

[73] Assignee: Accuride Corporation, Henderson, Ky.

[21] Appl. No.: 661,818

[22] Filed: Jun. 11, 1996

[51] Int. Cl.$^6$ ........................................................ B60B 3/04
[52] U.S. Cl. ............................................ 301/63.1; 301/95
[58] Field of Search ............................... 301/62, 63.1, 65, 301/95, 96, 97, 98

[56] References Cited

U.S. PATENT DOCUMENTS

| 3,612,614 | 10/1971 | Ware | 301/63.1 X |
| 3,859,704 | 1/1975 | Nasson | 301/63.1 X |

FOREIGN PATENT DOCUMENTS

| 28393 | 5/1981 | European Pat. Off. | 301/63.1 |
| 96399 | 6/1983 | European Pat. Off. | 301/95 |
| 3503882 | 8/1986 | Germany | 301/63.1 |

Primary Examiner—Russell D. Stormer
Attorney, Agent, or Firm—Kilgannon & Steidl

[57] ABSTRACT

A vehicle wheel with a roll-formed rim has an interior rim section and axially spaced first and second beadseat sections. A disc is attached at its skirt flange to the first beadseat section. The first beadseat section has radially outward and radially inward surfaces, both angled radially outward from the wheel axis for example at a fifteen degree angle. A roll-formed groove is formed in the radially inward surface of the first beadseat section, the groove having an inwardly facing cylindrical first surface. The skirt flange has an outwardly facing cylindrical first surface, which engages and is press-fit with the groove cylindrical first surface. The skirt flange and rim are then welded. The groove has a second frusto-conical surface adjacent the groove cylindrical surface. The skirt flange may have a second frusto-conical surface to mate with the groove second frusto-conical surface. The skirt flange may have a third frusto-conical surface to mate with the radially inward surface of the first beadseat section.

14 Claims, 6 Drawing Sheets

VEHICLE WHEEL

FIELD OF THE INVENTION

The present invention relates to wheels for motor vehicles, and more particularly to disc wheels or demountable rim assemblies respectively formed by either a disc or mounting ring welded to a rim.

BACKGROUND OF THE INVENTION

Hereinafter, where the attachment of a disc to a wheel rim is referred to, it should be understood that the description is also applicable to attachment of a mounting ring to a wheel rim. In demountable rims, the mounting ring is releasably secured to a hub, as is well known.

Manufacturers of wheels historically have chosen to attach the disc of the wheel to the rim of the wheel at a variety of locations. In certain instances, the outer skirt flange of the disc is welded to the rim at the drop center well of the rim. In other instances, the skirt flange of the disc is welded to the rim at the ledge of the rim. In further instances, the skirt flange of the disc has been welded to the angled under surface of the beadseat of the rim, or to a flat under surface of a built up, thickened, area below the beadseat of the rim. Each of these designs represents a compromise of sorts.

When the outer skirt flange of the disc is welded to the rim at the well, the internal space within the rim for vehicle components such as the brake assembly is minimized. This is not a problem where wheel diameter is adequate and internal rim components such as brake assemblies are not overly large. However, current designs of wheels for trucks, trailers, buses, etc. have reduced wheel diameters and larger brake assemblies, but still require sufficient internal clearance between the rim and brake assembly in order that heat from the brake assembly will not excessively dissipate through the rim to affect brake and tire performance and life. Thus, attachment of the disc outer skirt flange to the rim at the well, providing minimal interval space within the rim, can be a less desirable design. Further, a "full contour" appearance for the wheel cannot be obtained; i.e., the view from the outboard side of the wheel shows a discernable seam at the position where the disc outer skirt flange is welded to the rim, and a less aesthetic appearance of the wheel is obtained. "Full contour" is a term in the wheel industry that refers to the front wheel position of the vehicle.

Where the outer skirt flange of the disc is attached to the inflation ledge of the rim, design difficulties remain. The inflation ledge is present in certain rims wherein first and second axially spaced and outwardly angled beadseats are separated by a well and the ledge, generally cylindrical, extending between the first beadseat and the well. Where the outer skirt flange of the disc is welded to the ledge, a "full contour" wheel appearance cannot be obtained, and there may be less interior space within the rim for the brake assembly to have proper heat dissipation which is not excessively transferred to the rim.

Accordingly, numerous wheel designs have seen the attachment of the outer skirt flange of the disc to the under surface of the beadseat, the upper tire-contacting surface of the beadseat being outwardly angled. Where the under surface of the beadseat also is outwardly angled, in a frusto-conical shape, the outer surface of the disc outer skirt flange is also designed with a matching frusto-conical shape so that the two frusto-conical shapes contact each other on assembly and welding of the disc outer skirt flange to the rim. In this design, a "full-contour" appearance wheel can be obtained, and adequate space may be obtained within the rim for the brake assembly to properly dissipate heat. However, other significant problems result. It is difficult to axially position the disc outer skirt flange and the rim upon assembly prior to welding because of the two frusto-conical attachment surfaces being angled with respect to the wheel axis, and because of tolerance angle variations of the two frusto-conical surfaces. A preliminary tack welding operation may be necessary for accurate positioning of the disc flange and rim prior to passing the disc flange and rim to the final welding position in the assembly operation. This results in an additional assembly operation and additional assembly expense. Further and importantly, the disc outer skirt flange and rim, because of the frusto-conical attachment surfaces, cannot be press-fit together prior to welding, thus providing a potentially less secure attachment than that found for example where the rim well or ledge cylindrical surface is attached to the disc skirt flange.

In a still further wheel design, the outer skirt flange of the disc has been attached to the under surface of a beadseat having an outwardly angled upper, tire-contacting surface, with the under surface of the beadseat being built up in a radially inward direction out of additional rim material so that the entire under surface of the material under the beadseat is cylindrical. A "full contour" appearance wheel may be obtained. However, this design does not allow the rim to be made of strip steel without adding additional operations greatly affecting production speed, is very expensive to manufacture out of sectioned steel, and is excessively heavy because of the build up of material under the beadseat.

Examples of the above prior art designs may be found for example within the following: U.S. Pat. Nos. 5,219,441 and 4,504,095; 1974 catalog M-220-44A (Wheels and Rims) of Firestone Steel Products Company, page 7; and German Offenlegungsschrift 1918022.

SUMMARY OF THE INVENTION

The present invention is intended to overcome the deficiencies of the above-noted prior art. A vehicle wheel is disclosed having a rolled strip steel rim contour with an interior rim section (having a well and perhaps a ledge) and first and second beadseat sections extending in opposite directions from the rim interior section to terminate in rim flange sections. The wheel has a disc attached to the rim in the area of the rim first beadseat section. The first beadseat section has radially outward and radially inward surfaces, both of which are angled outwardly from the wheel axis. The angled radially inward surface of the first beadseat section has a circumferential groove roll-formed into its surface, which groove is formed to have an inwardly facing cylindrical first surface. The disc has a skirt flange about its outer circumference, the skirt flange having an outwardly facing cylindrical first surface. The groove cylindrical first surface and skirt cylindrical first surface engage each other upon assembly of the rim to the disc flange to allow very accurate axial positioning of the rim and disc, and the respective cylindrical surfaces are press-fit together to provide an initial secure attachment. Welding for the final attachment follows, with excessive welding not being required because of the press-fit attachment helping the welds carry the wheel load. Lighter gage materials may also be used in certain instances. By virtue of the mating cylindrical surfaces, the press-fit attachment, and the resultant very accurate axial positioning of rim and disc flange, radial and lateral runout are advantageously minimized.

In further aspects of the present invention, the afore described inner beadseat groove also has an inwardly facing angled second surface which can mate with an outwardly facing and angled skirt flange second surface. An outwardly facing and angled skirt flange third surface also can be provided to mate with the radially inward surface of the first beadseat section adjacent the groove. The designed strength of the rim and disc attachment accordingly can be varied.

A "full contour" wheel appearance is obtained by the present invention, and adequate rim internal space is provided for brake assemblies and other components. The present invention also permits an efficient manufacturing and assembly operation with minimized expense.

Other features and advantages of the present invention will be apparent from the following description, drawings and claims.

DETAILED DESCRIPTION OF EMBODIMENTS

Figure 1:
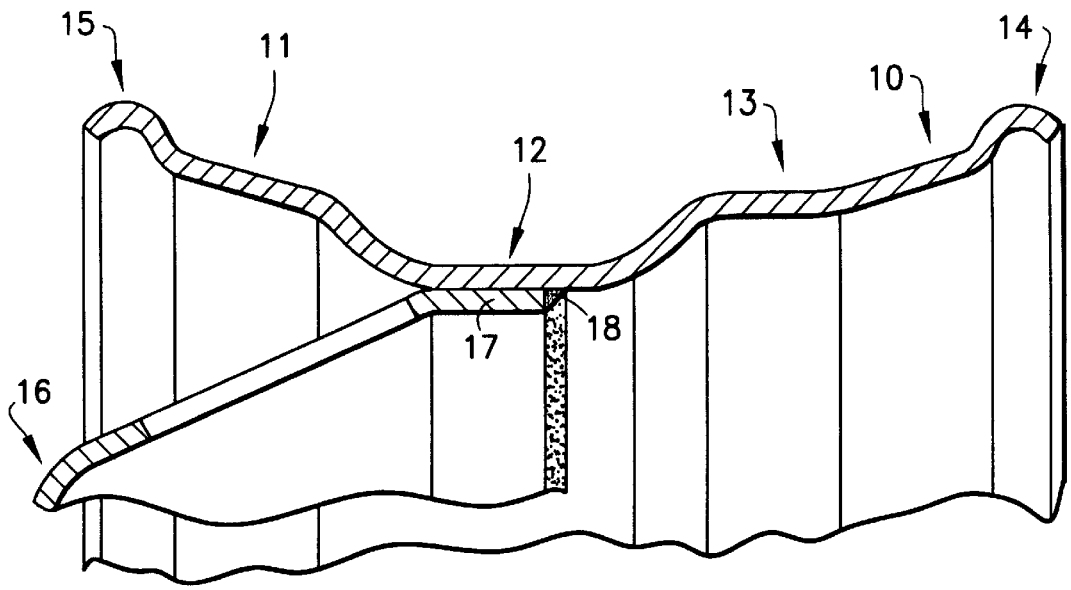
FIG. 1 is a partial section along the axis of one form of a prior art disc wheel.

Referring to FIG. 1, the prior art wheel rim contour shown has first and second axially spaced outwardly angled beadseat sections 10 and 11 separated by an interior rim section comprised of well 12 and ledge 13. Beadseat sections 10 and 11 terminate in rim flange sections 14 and 15. Disc 16 is shown welded at its outer skirt flange 17 to the cylindrical underside of well 12 at weld 18. As noted hereinbefore, this design does not present a "full contour" wheel appearance, and may leave inadequate internal rim space for components including brake assemblies.

Figure 2:
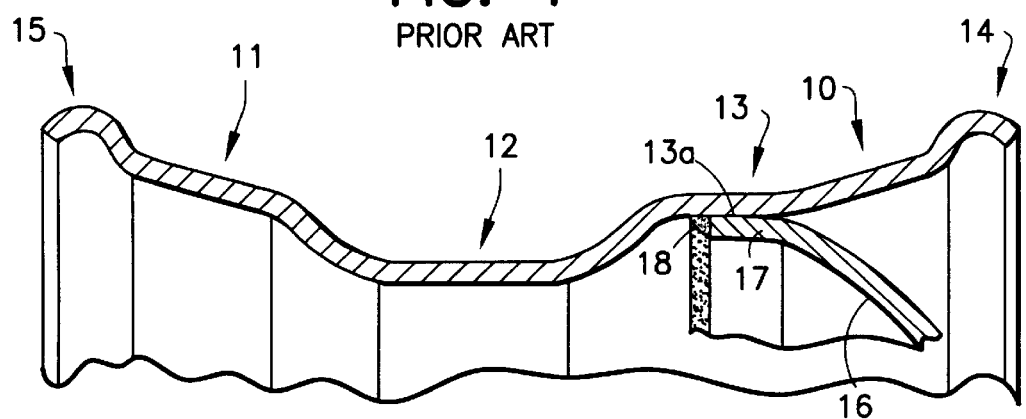
FIG. 2 is a partial section along the axis of a second form of prior art disc wheel.

In the FIG. 2 prior art design, where corresponding parts are correspondingly numbered, the disc outer skirt flange 17 is welded at weld 18 to the cylindrical under surface 13a of cylindrical ledge 13. A "full contour" wheel appearance may not be obtained, and less internal rim space will remain for brake assemblies, etc.

Figure 3:
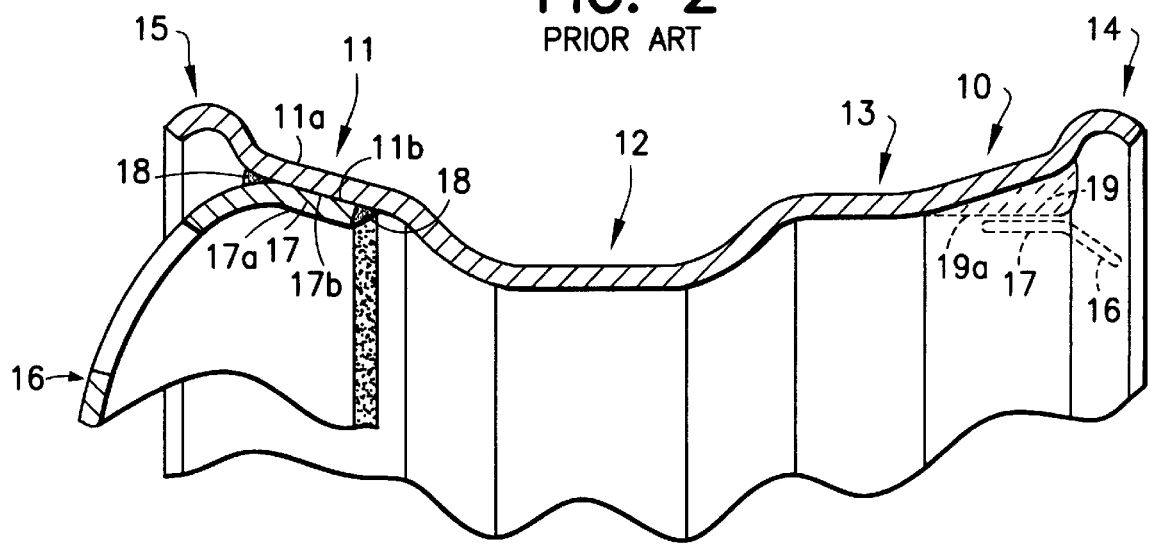
FIG. 3 is a partial section along the axis of a third form of prior art disc wheel, also illustrating in dotted line an alternative fourth form of prior art disc attachment.
Figure 4:
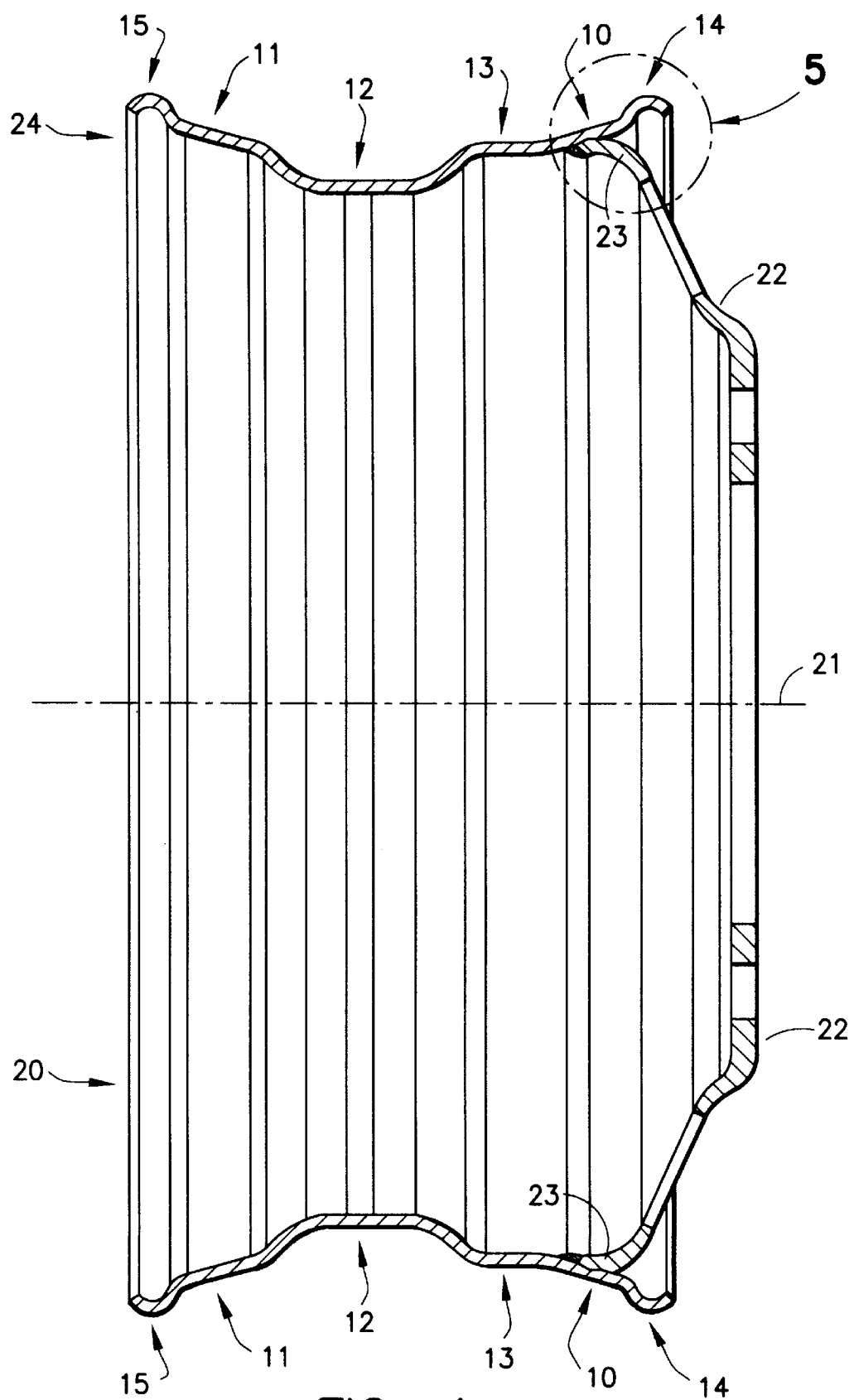
FIG. 4 is a full section along the axis of a disc wheel of the present invention.

In the FIG. 3 prior art design having the solid line attachment design shown to the left of FIG. 3, beadseat section 11 has radially outward and radially inward surfaces 11a and 11b. Surface 11b accordingly is frusto-conical in shape with respect to the wheel axis. Disc outer skirt flange 17 has radically outward surface 17b which is also frusto-conical in shape with respect to the wheel axis, and frusto-conical surfaces 11b and 17b are shown mating with each other. The skirt flange 17 is welded to the beadseat 11 at welds 18. Radially inward surface 17a of the disc flange, alternatively to the manner in which shown, may be cylindrical with respect to the wheel axis or may be angled slightly outwardly toward the free end of the flange in order to facilitate the removal of spun discs from the mandrel used in the spinning process. The solid line attachment design shown to the left of FIG. 3 permits a "full contour" wheel appearance to be obtained, and may allow adequate internal rim space for brake assemblies. However, as noted hereinbefore, it is difficult to axially position in an exact manner the disc flange and rim beadseat prior to welding because of the frusto-conical shapes and tolerance angle variations of the frusto-conical shapes. Preliminary tack welding of the disc flange and rim will be needed for proper axial positioning prior to passing the disc flange and rim to the final welding position, which results in an extra manufacturing operation and further expense. Also, the beadseat 11 and disc flange 17 cannot be press-fit together prior to welding, so that a less secure attachment may be obtained and more welding will be needed in order for the welds to carry the load. Excesive runout also is to be expected.

In an alternate prior art attachment design shown in dotted line form to the right of FIG. 3, beadseat section 10 on its underside has been built up out of sectioned steel with additional material 19 to provide a cylindrical radially inner surface 19a to which disc outer skirt flange 17 is welded. While a "full contour" wheel appearance may be obtained, the rim contour cannot economically and efficiently be made of strip steel which is the well-known material and operation for forming a present day rim contour prior to assembly. The rim also is very expensive to manufacture out of sectioned steel, and still leaves inadequate rim internal space for brake assemblies, etc.

Turning now to a presently preferred embodiment of the present invention, reference is made to FIGS. 4–7. Corresponding wheel parts continue to be correspondingly numbered. Wheel 20 has central axis 21. Disc 22 has outer skirt flange 23 extending about the outer circumference of the disc, skirt flange 23 being attached to the rim 24 at first beadseat section 10. First beadseat section 10 has radially outward surface 10a extending at an angle of fifteen degrees with the wheel axis, and radially inward surface 10b also extending at an angle of fifteen degrees with the wheel axis. However, within the surface 10b there is formed an upwardly extending groove 25 in a manner hereafter described, groove 25 extending circumferentially about the wheel axis 21. Groove 25 is comprised of inwardly facing first cylindrical surface 26 and an adjacent second frusto-conical surface 27 with respect to the wheel axis 21. Surface 27 may assume a thirty degree angle with the wheel axis. The outer skirt flange 23 in turn has an outwardly facing first cylindrical surface 28 with respect to the wheel axis and an adjacent frusto-conical second surface 29 assuming the same frusto-conical angle as groove frusto-conical surface 27 upon wheel assembly. The outer skirt flange cylindrical surface 28 also has adjacent thereto curved surface 30 of disc 22. The disc outer skirt flange 23 also has a radially inner surface 31 which may be slightly angled outwardly in a direction toward the rim interior section (well 12 and ledge 13) in order to facilitate removal of the disc, where spun, from the mandrel of the spinning equipment.

Figure 5:
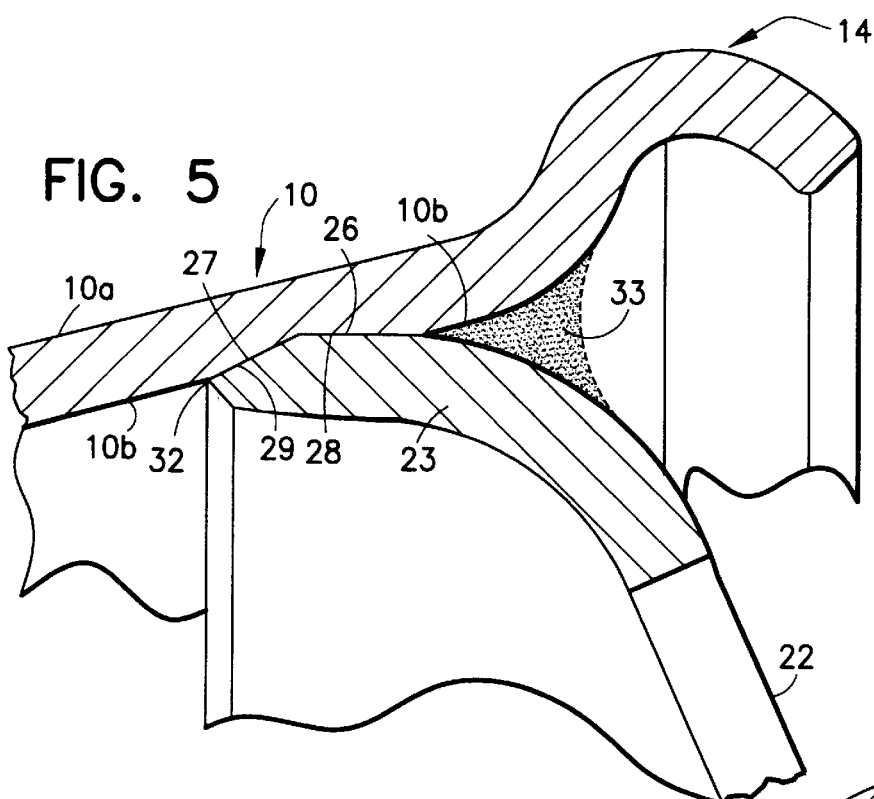
FIG. 5 is an enlarged detail view from FIG. 4 of the area of attachment of the disc flange to the rim in the present invention.
Figure 6:
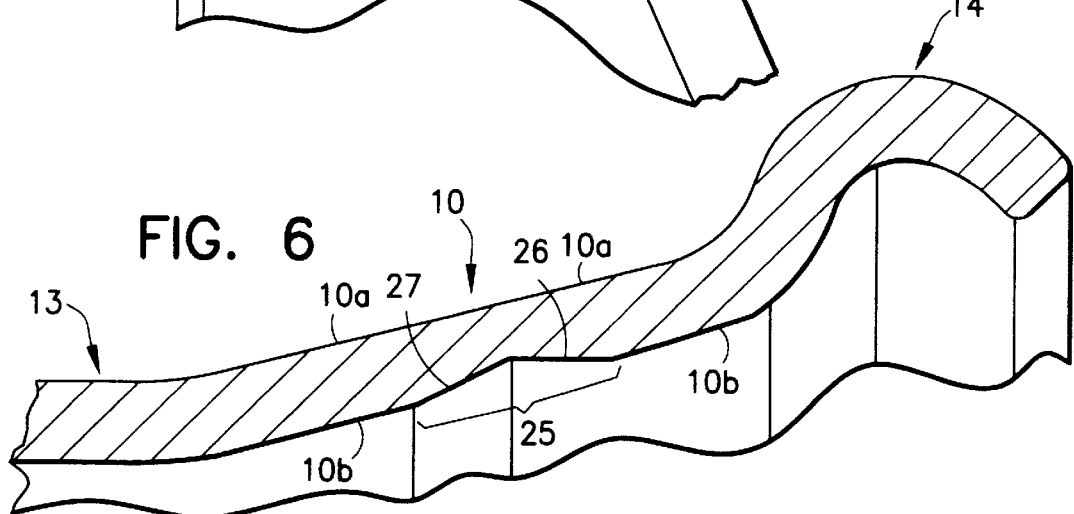
FIG. 6 is a detail view of the rim portion shown in FIG. 5.
Figure 7:
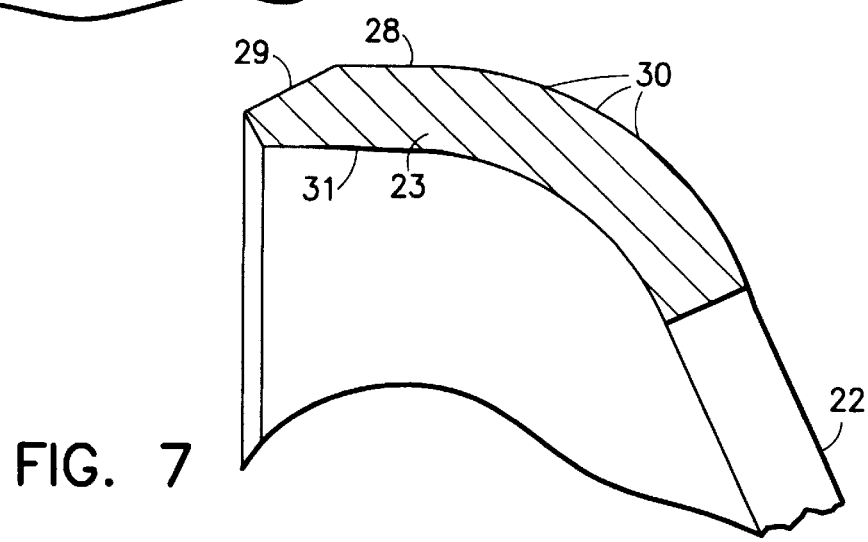
FIG. 7 is a detail view of the disc outer skirt flange shown in FIG. 5.

FIG. 5 shows in detail the positioning of the rim of FIG. 6 and disc outer skirt flange of FIG. 7. Skirt flange cylindrical surface 28 mates with groove cylindrical surface 26, and skirt flange frusto-conical surface 29 mates with groove frusto-conical surface 27. Because of the respective configurations, the rim and disc outer skirt flange can be very accurately positioned axially with respect to each other, and the respective mating cylindrical surfaces 26 and 28 allow a press-fit operation to initially securely attach the rim and disc outer skirt flange. Thereafter permanent welds may be applied, for example as shown in dotted line at positions 32 and 33 of FIG. 5. Alternatively, laser welding may be carried out directly through the rim to the mating surfaces. Excessive welding is not required for secure attachment and load carrying capabilities because of the ability to press fit the cylindrical surfaces together, and the press fit relationship of the disc and rim importantly serves to carry part of the wheel load.

As will be apparent from the above description of FIGS. 4–7, and the dotted line weld contour at 33 in FIG. 5, a "full contour" appearance wheel is obtained, and adequate interior rim space is provided for brake assemblies, etc. A very accurate positioning of the rim and disc is obtained, as well as a very secure attachment because of the ability to press fit together the respective cylindrical surfaces. It also has been determined that runout is greatly minimized, a major advantage in wheel design. The manufacturing process is simple and economical.

Figure 10:
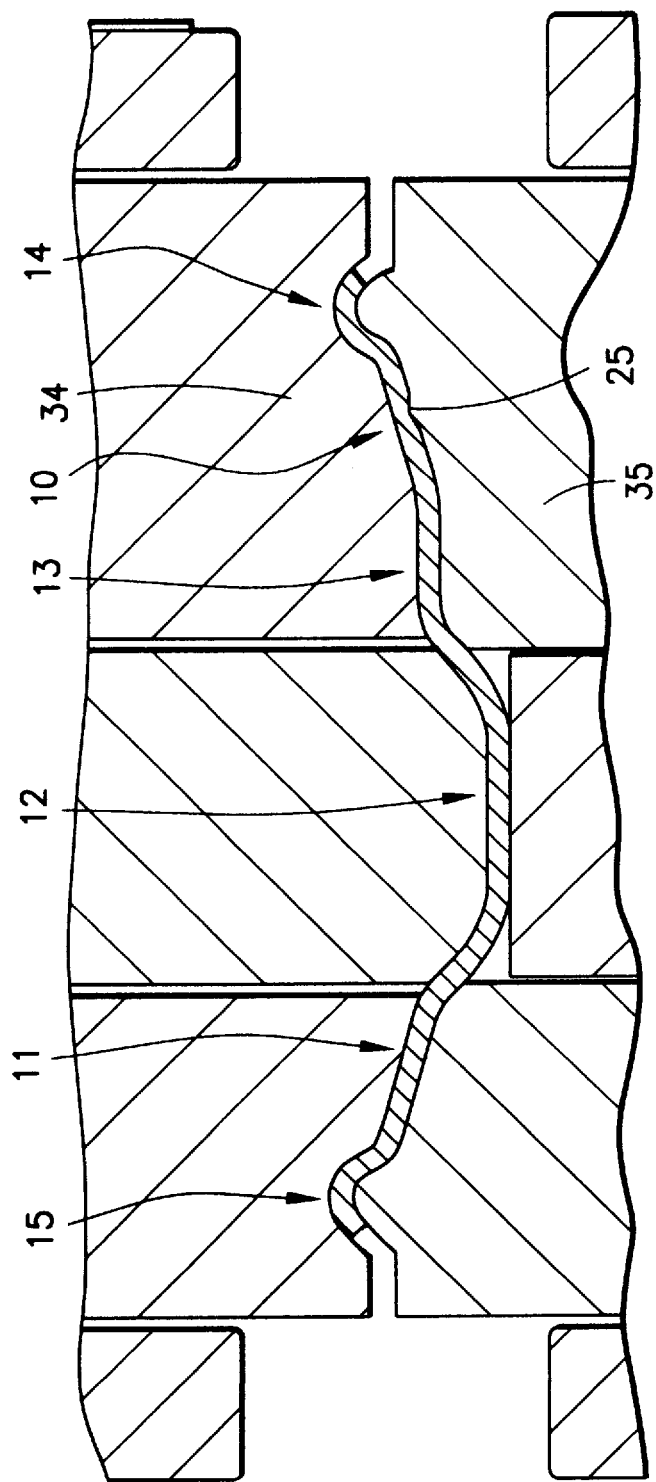

As previously noted, the disc 22 may be spun. The rim 24 may be formed by the rolling of strip steel. FIG. 10 illustrates one of the later rolling passes, wherein rollers 34 and 35 are shown operating on first beadseat section 10 and roller 35 is configured as shown to roll groove 25 into radially inward frusto-conical surface 10b of first beadseat section 10. Alternatively, groove 25 may be spun, or perhaps machined. Referring back to FIG. 7, surfaces 28 and 29 of disc outer skirt flange 23 are formed to the proper groove-mating dimensions by a machining operation.

Figure 8A:
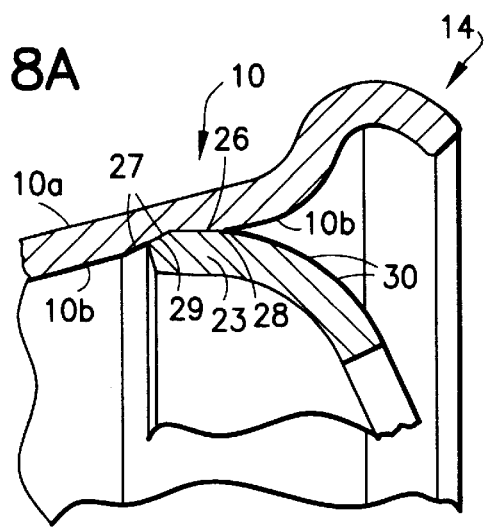
FIGS. 8A, 8B and 8C are partial section detail views illustrating first, second and third alternate embodiments of the present invention.
Figure 8B:
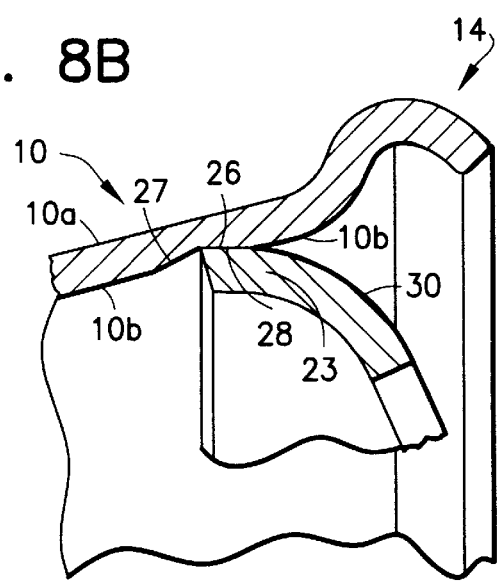
Figure 8C:
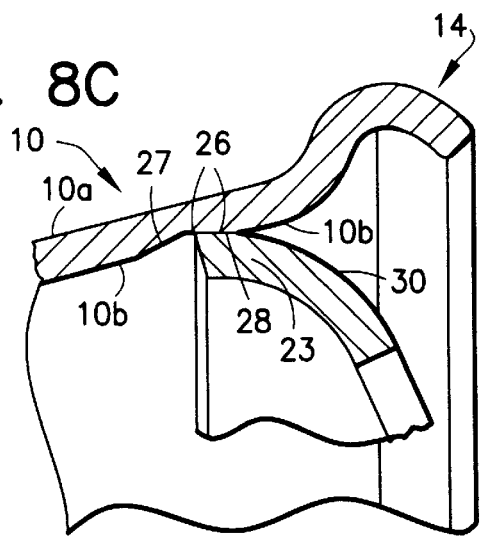

FIG. 8A, 8B and 8C illustrate first, second and third alternate embodiments of the present invention. FIG. 8A differs from FIGS. 4–7 only in that surface 29 of disc outer skirt flange 23 is of a lesser length and thus only a portion of groove 25 is filled. In FIGS. 8B and 8C, the only differences from FIGS. 4–7 are that the portion of skirt flange 23 having surface 29 has been eliminated, and as to FIG. 8C, surface 28 of skirt flange 23 is of a lesser length. In all other respect, the embodiments of FIGS. 8A, 8B and 8C conform to FIGS. 4–7. The welds may be applied as previously described.

Figure 9B:
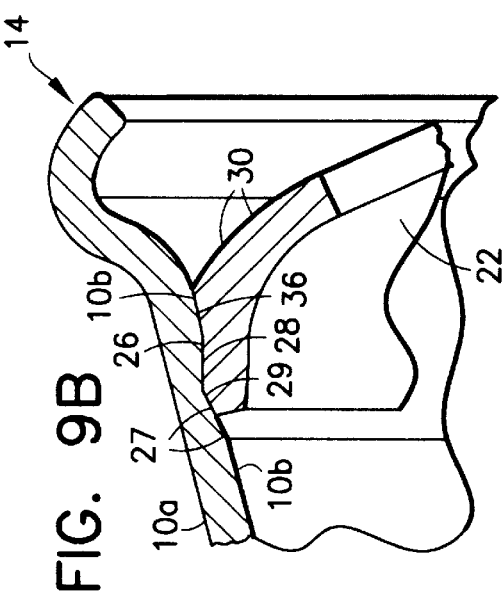
FIGS. 9A, 9B, 9C and 9D are partial section detail views illustrating fourth, fifth, sixth and seventh alternate embodiments of the present invention; and, FIG. 10 is a partial section along the axis of rollers illustrating the manner in which the groove of the present invention is formed.
Figure 9D:
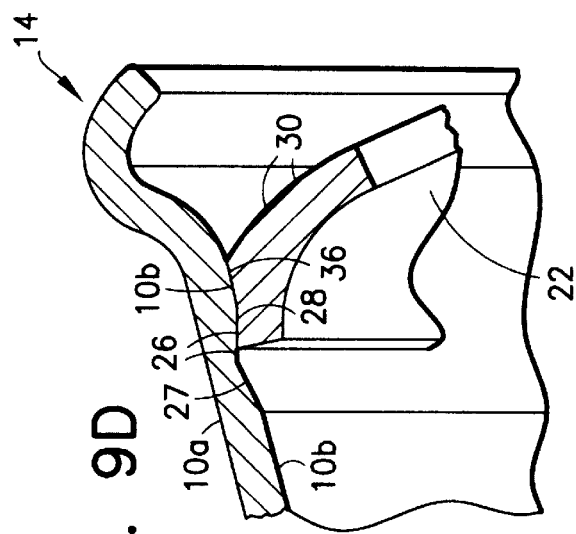
Figure 9A:
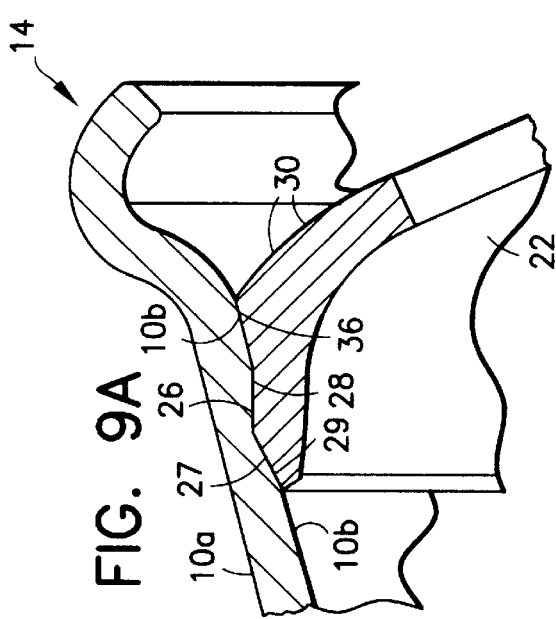
Figure 9C:
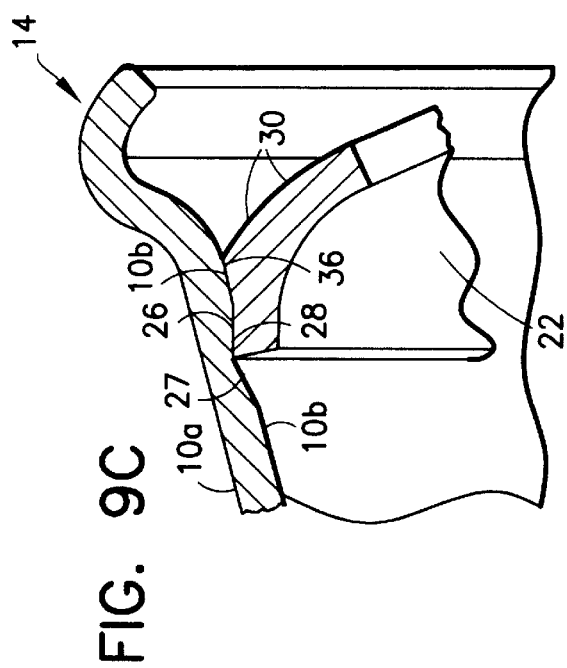

FIGS. 9A, 9B, 9C and 9D illustrate fourth, fifth, sixth and seventh alternative embodiments of the present invention. FIGS. 9A, 9B, 9C and 9D differ from FIGS. 4–7 in that disc outer skirt flange 23 has an additional frusto-conical third surface 36 between cylindrical surface 28 and curved surface 30 of disc 22, which additional surface 36 mates with frusto-conical radially inward surface 10b of first beadseat section 10. In all other respects, FIG. 9A conforms to FIGS. 4–7; FIG. 9B conforms to FIG. 8A; FIG. 9C conforms to FIG. 8B; and FIG. 9D conforms to FIG. 8C. The welds again may be applied as previously noted.

It will be appreciated by persons skilled in the art that numerous variations and/or modifications may be made to the invention without departing from the spirit and scope of the invention. The present embodiments are, therefore, to be considered as illustrative and not restrictive. Merely as examples, the invention may be used with five degree as well as fifteen degree rim beadseat contours; may be used on the opposite rim beadseat section; may be used on duplex wheels; and may be used on symmetrical rims.

What is claimed is:

1. A vehicle wheel, said wheel having a rim extending about a central wheel axis and comprising an interior rim section and first and second rim beadseat sections generally extending in opposite directions from the interior section to terminate in rim flange sections, said wheel further having a mounting means attached to the rim; said first rim beadseat section having radially outward and radially inward surfaces in respect to the wheel central axis, both the said radially outward and radially inward surfaces being angled radially outward from the wheel axis in a direction away from the interior rim section; the said angled radially inward surface of the first beadseat section having a groove formed therein extending circumferentially about the wheel axis, said groove including an inwardly facing cylindrical first surface; said mounting means having a skirt flange about its outer circumference, the skirt flange having an outwardly facing cylindrical first surface; said groove cylindrical first surface and said skirt cylindrical first surface engaging each other when the mounting means is attached to the rim.

2. The invention of claim 1, wherein said groove inwardly facing cylindrical first surface and said skirt outwardly facing cylindrical first surface are press fit with respect to each other.

3. The invention of claim 1, said groove having an inwardly facing second surface directly adjacent the first groove surface on the rim interior section side of the groove, said groove second surface being angled radially outward from the wheel central axis in a direction extending away from the rim interior section.

4. The invention of claim 3, said skirt flange having an outwardly facing second surface directly adjacent the skirt flange first surface at a corresponding angle with respect to the groove second surface to engage the groove second surface when the disc or mounting ring is attached to the rim.

5. The invention of claim 1, wherein said skirt flange has an additional outwardly facing surface directly adjacent the skirt flange first surface on the first beadseat associated flange side of the groove, the skirt flange additional outwardly facing surface having a corresponding angle with respect to the radially inward surface of the first beadseat section to engage the radially inward surface of the first beadseat section when the mounting means is attached to the rim.

6. The invention of claim 1, wherein the first beadseat radially inward and radially outward surfaces are inclined at an angle of approximately fifteen degrees with respect to the wheel central axis.

7. The invention of claim 1, wherein the rim first beadseat section and groove therein are roll formed.

8. The invention of claim 7, wherein the mounting means is formed by spinning and the skirt flange cylindrical first surface is obtained by machining.

9. The invention of claim 2, wherein the mounting means is welded to the rim.

10. The invention of claim 1, wherein the skirt flange has a radically inward surface which extends towards it outer end at a slight angle away from the wheel central axis in the direction of the rim interior section.

11. The invention of claim 1, wherein the mounting means is a disc.

12. The invention of claim 1, wherein the mounting means is a mounting ring.

13. The invention of claim 1, wherein the radially outward and radially inward surfaces of the first rim beadseat section are inclined at the same angle with respect to the wheel central axis.

14. The invention of claim 1, wherein the skirt flange extends toward the interior rim section.

* * * * *